OTTO FISCHER & OSKAR FISCHER.
WARP TYING MACHINE.
APPLICATION FILED DEC. 16, 1912.

1,069,405.

Patented Aug. 5, 1913.
6 SHEETS—SHEET 3.

Witnesses
C. A. Walter
L. G. Anger

Inventors
Otto Fischer & Oschar Fischer
by R. Halladay
Attorney

OTTO FISCHER & OSKAR FISCHER.
WARP TYING MACHINE.
APPLICATION FILED DEC. 16, 1912.

1,069,405.

Patented Aug. 5, 1913.
6 SHEETS—SHEET 5.

Witnesses
C. D. Walter.
L. G. Anger.

Inventors
Otto Fischer & Oskar Fischer
by R. Hadden
Attorney

OTTO FISCHER & OSKAR FISCHER.
WARP TYING MACHINE.
APPLICATION FILED DEC. 16, 1912.

1,069,405.

Patented Aug. 5, 1913.
6 SHEETS—SHEET 6.

Witnesses
C. W. Walter
L. G. Anger

Inventors
Otto Fischer & Oscar Fischer
by R. Husum
Attorney

UNITED STATES PATENT OFFICE.

OTTO FISCHER AND OSKAR FISCHER, OF PLAUEN, GERMANY.

WARP-TYING MACHINE.

1,069,405.   Specification of Letters Patent.   Patented Aug. 5, 1913.

Application filed December 16, 1912. Serial No. 736,978.

*To all whom it may concern:*

Be it known that we, OTTO FISCHER and OSKAR FISCHER, subjects of the German Emperor, residing at Plauen-im-Vogtland, in Germany, have invented certain new and useful Improvements in Warp - Tying Machines, of which the following is a specification.

The object of this invention is to provide improved apparatus for tying fresh lengths of warp thread to warps which have been used up.

An embodiment of the invention is shown in the accompanying drawing, in which—
Fig. 4 is a rear view of the machine partly in section.

The machine comprises a frame formed of two T-shaped parts 51, 52 erected upon a carriage 1, which is automatically movable upon rails parallel with the warp beam. The actuation is effected by means of a pulley which is provided with a crank handle and drives shafts carrying cams, toothed wheels and other gear, as will be described hereinafter.

Figure 4:
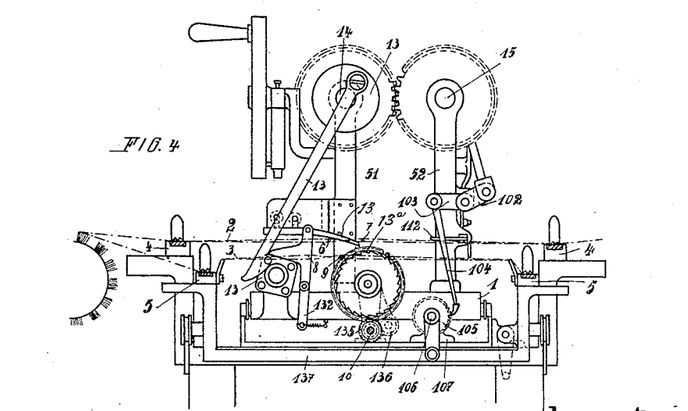
Figure 17:
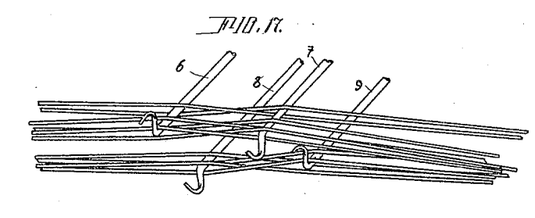
Fig. 17 is a perspective elevation showing the arrangement of the warps engaged with the machine.

In the drawing, the reference characters 2 and 3 designate warps to be tied together, the ends of these warps being attached to clamps 4, 5 (Fig. 4) and the warps being led over and under spindles 6, 7 and 8, 9 as shown in Fig. 17, so that the warps cross each other between the spindles. One of the clamping devices 5 is adjustable by a screw spindle 10 in the longitudinal direction of the machine, in order that the warps can be accurately adjusted one above the other. This may be effected by hand by means of a crank on the spindle, or by a regulating device to be described hereinafter. The spindles 6, 7 and 8, 9 are mounted in bearings 11 fixed to the carriage 1, and are actuated by means of a shaft 12 driven by a pawl 13 and lantern wheel 13ª so that in the course of one revolution of the driving shafts 14 and 15 the shaft 12 makes half a revolution, the rotation of the shaft 12 being intermittent. The spindles 6, 7 and 8, 9 have hooked ends which serve to retain the warps adjacent thereto, and in the course of each half revolution of these spindles the warps nearest the hooks are dropped, and the next warps then come into position to be dropped by the next half revolution.

For tensioning the dropped warps and moving them clear of the hooked spindles the machine has an appliance comprising a rotatable comb 16 (Figs. 25, 26) which has tines 17 projecting in opposite directions. This comb is pushed between the two layers of warps, with its tines 17 horizontal, shortly before the warps are dropped, and is then rotated through 90° and retracted at the moment when the hooked spindles rotate. By this means the warps engaged with the tines are tensioned and those released by the hooks are moved clear of the spindles, whereupon a separating needle 18 descends between the released warps and the warps still on the spindles, and moves horizontally toward the tying appliance, taking the released warps with it. The comb 16 is then moved back to slacken the warps on the hooked spindles, and is rotated through 90° so that its tines return to horizontal position clear of the warps, the machine with the comb being advanced so that the operation can be repeated. The shank 19 of the comb is rotatable in a sleeve 22, the latter being slidable in a bearing 20 and being thrust toward the warps by a spring 21. A pin 23 fixed to the sleeve 22 and projecting into a slot in the bearing prevents rotation of the sleeve. A ring 24 slidably and rotatably mounted on the rear end of the sleeve 22 has lateral projections 25 engaging it with the slotted end of a bell-crank 27, and the latter is rocked by a cam 26, whereby the ring 24 is reciprocated. The shank 19 has fixed to it a pin 28 entering an oblique cam-slot 29 in the ring 24, the sleeve 24 having an aperture 30 giving passage to the pin 28.

Figure 25:
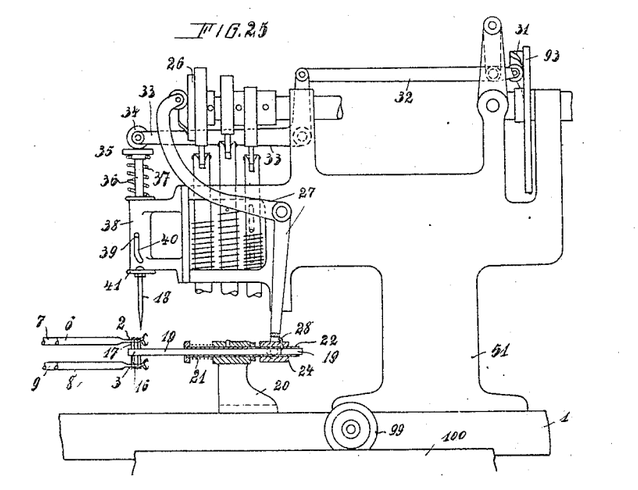
Figs. 25 and 26 are respectively a side elevation and plan view of an appliance for separating the warps.
Figure 26:
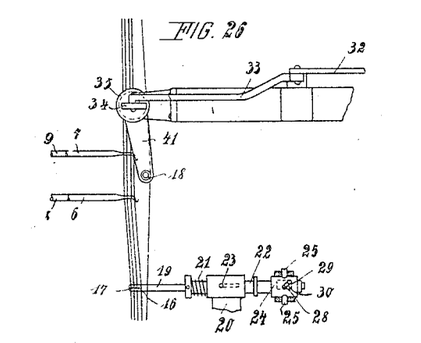

When the tines of the comb are horizontal the pin 28 is at that end of the cam-slot 29 which is farthest removed from the warps. When ring 24 is moved away from the warps it first slides on the sleeve 22, and the cam-slot 29 acting on the pin 28 causes the comb to rotate through 90°, the sleeve 22 being retained by the spring 21. When the pin 28 has reached that end of the slot which is nearest the warps, the continued movement of the ring 24 retracts the comb from between the warps.

The separating needle 18 is actuated by a cam disk 31, rod 32 and bell-crank 33, the latter carrying a roller 34 which rests on the head 35 of a spindle 36 held up by a spring 37 in a bearing 38, in which the spindle 36 is slidable. A pin 39 projects from the spindle into a bent slot 40 in the bearing, so that in the course of its longitudinal movement the spindle must also make a rotary movement. A crank 41 fixed to the lower end of the spindle carries the separating needle 18.

Figure 1:
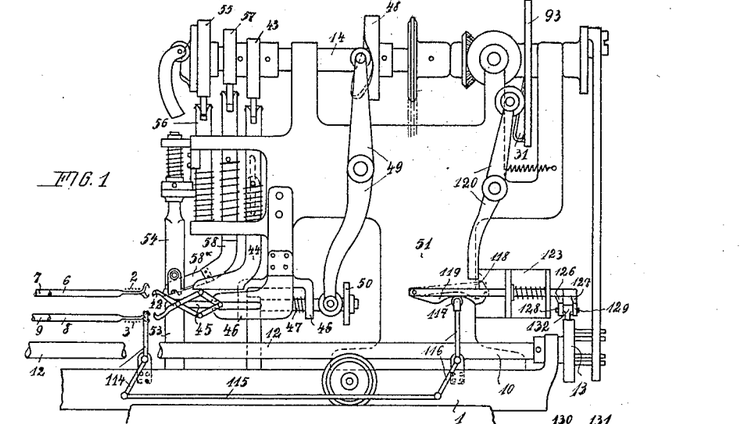
Figure 1 is a side elevation of the apparatus, with parts broken away, Fig. 2 a sectional plan view of a detail thereof, and Fig. 3 a plan view of part of the actuating mechanism.
Figures 2, 3:
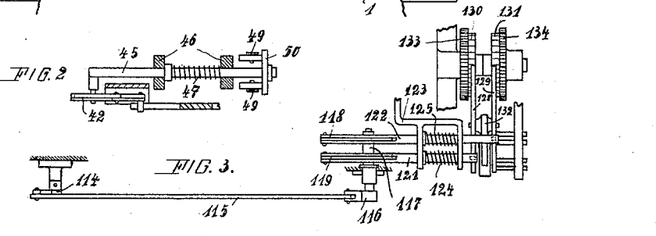
Figures 10, 11:
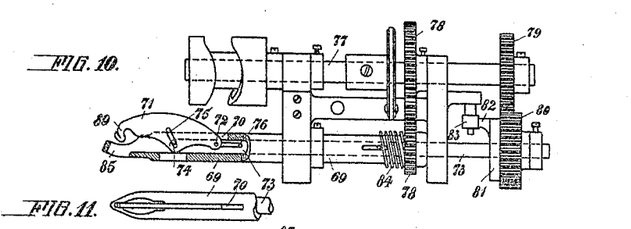
Figs. 10 to 12 are detail views of the tying and cutting appliances.
Figures 12, 13, 14, 14A, 15, 16:
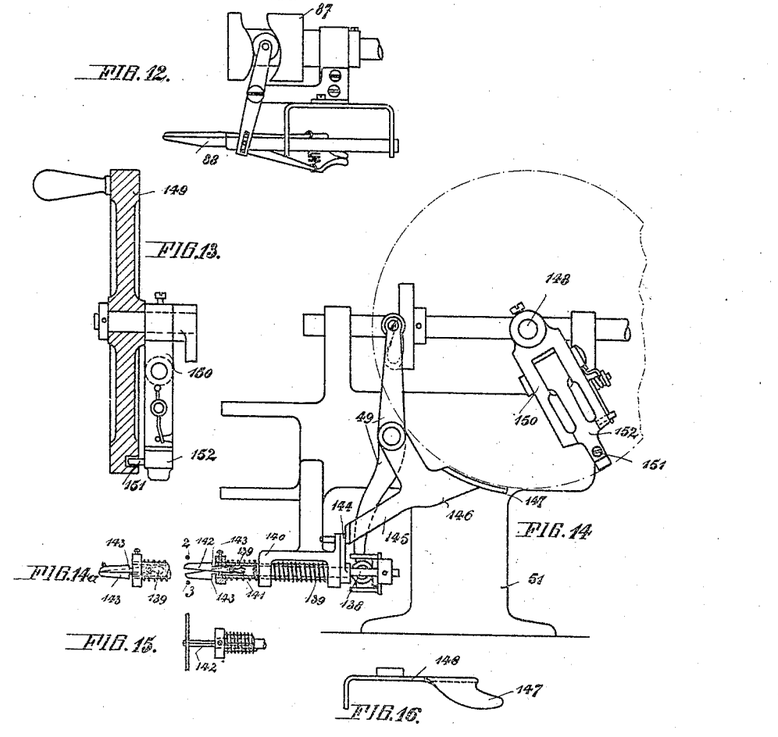
Figs. 13 to 16 are detail views of a stop motion forming part of the machine.

The warps removed by the needle 18 from the hooked spindles are transferred to two hooked jaws 42 (Figs. 1 and 2) which are then closed by a cam 43 acting on a presser 44, and are retracted by a spindle 45 which is slidable in bearings 46. A spring 47 tends to thrust this spindle toward the warps, and a double armed lever 49, engaging a collar 50 on the spindle, and actuated by a cam 48, retracts the spindle. The closing of the jaws 42 moves the warps between the jaws into one plane, and the jaws transfer these warps to a gripping device 53, 54, the upper member 54 of which is depressed by a cam 55 and spring-pressed rod 56, so that the warps are gripped. At the same time a knife, not shown in the drawing, is actuated by a cam 57 and rod 58, and cuts the free end of the fresh warp and the end of the old warp lying toward the beam. A presser 59, actuated by a cam 60 and rod 61, then acts on the threads and draws them through the gripper device 53, 54, and between the member 53 and 53ᵃ, so that the threads become sufficiently slack for tying. Simultaneously with the closing of the jaws 42 a fork 67 ascends and takes the threads between its prongs, this fork being moved by cams 62 and 63, and levers 64, 65, 66. When the threads held by the members 53, 54 have been slackened by the member 59 the fork 67 is moved toward the frame 51, 52 for the purpose of transferring the threads to a knotting appliance 68 (Figs. 10, 11, 12).

The knotting appliance comprises a sleeve 69 terminating at one end in a point somewhat like a pen. The sleeve 69 has a slot 70, in which lies a flat hook 71 pivoted at 72 to the sleeve. A rod 73 extends into the sleeve 69, in which it is slidable, the rod having a forked end with a cross-pin 74 which passes through an oblique slot 75 in the hook 71. The rod 73 has a slot 76 for the pivot 72 of the hook. Above the sleeve 69 there is a shaft 77, driven by a chain from the shaft 15. Toothed wheels 78, meshing with each other and fixed to the shaft 77 and sleeve 69 respectively, rotate the sleeve and are proportioned so that the sleeve makes two revolutions during one revolution of the shafts 14 and 15. Another toothed wheel 79 fixed to the shaft 77 meshes with a toothed wheel 80 which is rotatable on the rod 73 and has fixed to it a cam disk 83. In the course of two revolutions of the sleeve 69 this cam disk makes one revolution, in the course of which the boss 82 of the cam rides over a roller 83, whereby the rod 73 is partly withdrawn from the sleeve, so that the hook 71 is raised by the pin 74 working in the slot 75, as shown in Fig. 10. A spring 84 then restores the rod 73 to its normal position, so that the hook is dropped again and protrudes from a slot 85 in the underside of the sleeve.

Figure 9:
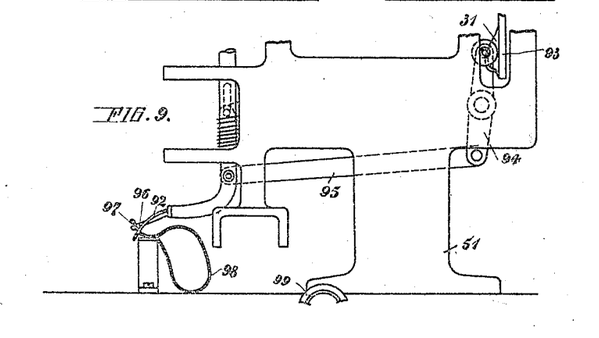
Fig. 9 is an elevation of an appliance for gathering the cut ends of the warps.
Figure 18:
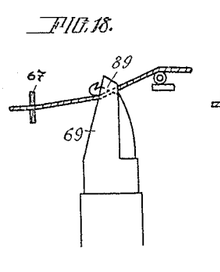
Figs. 18 to 24 illustrate the operation of knotting one of the threads.
Figures 19, 20:
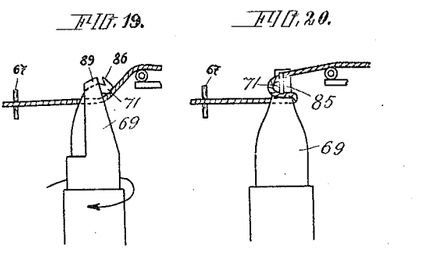
Figures 21, 22:
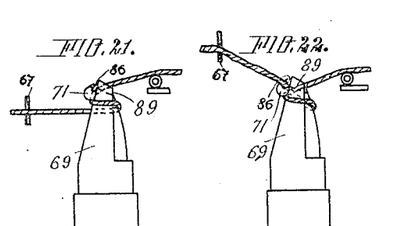
Figure 23:
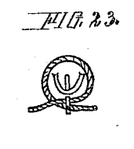
Figure 24:
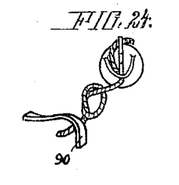

The manner of knotting the threads, illustrated in Figs. 18 to 24, will now be described. For clearness, only one of the threads is shown in Figs. 18 to 24. The fork 67 carries the threads behind the hook 71 protruding from the slot 85, as shown in Fig. 18. The hook then makes a revolution, during which its rounded back engages the threads (Figs. 19 and 20), so that on completion of the revolution the threads are looped around the tube 69 and the shank of the hook, as shown in Fig. 21. The fork 67 then advances, as shown in Fig. 22, so that the thread-ends held by the gripper 53, 54 are engaged with the notch 86 of the hook. During these operations the presser 59 recedes, in order to slacken the threads and enable them to be manipulated by the knotter. When the threads have been engaged with the notch 86 a pair of shears 88 actuated by a cam 87 on the shaft 77 (Fig. 12) advances and cuts the threads between the fork 67 and the gripper 53, 54. The rod 73 is then suddenly withdrawn by the action of the cam disk 81 (Fig. 10), so that the hook is rocked and draws the threads through the slot 85, the inclined surface 89 causing the threads to move toward the point of the knotter. At the same time a curved arm 90 (Figs. 5 and 24) actuated by a cam disk 91 is laid over the threads and moved downward, whereby the loosely looped threads are stripped off the point of the knotter (Fig. 24), but the ends of the thread are temporarily retained in the notch 86, so that knots are made and drawn tight by the downward movement of the member 90, which also ultimately pulls the threads out of the notch 86. When the knotter has completed its first revolution (Fig. 21), the next two warps to be tied are stripped off the hooked spindles, and while the knotter is acting as described above these warps are brought up by the jaws 42 and transferred to the gripper 53, 54. The length of thread cut off by the knife on the rod 58 and the shears 88 is seized by fingers 92 (Fig. 9), which are actuated by a toothed wheel 93, cam 31 and levers 94, 95. A finger 96 moves apart the ends 97 of a looped spring 98, and the fingers 92 place the cut thread between these spring-ends. The projecting fibers of the cut threads inserted in the course of successive tying operations interlock with each other, and the threads are gradually pressed into the loop of the spring 98, whence they ultimately drop in the form of a more or less tangled mass. The carriage 1 has wheels 99 running on rails 100, and is driven by a cam 101, levers 102, 103, pawl 104 and ratchet wheel 105, the ratchet wheel being fixed to a screwed shaft 106 engaged with screwed eyes 107 connected to the rails so that by turning the shaft 106 by means of a crank the carriage is moved along the rails.

Figure 5:
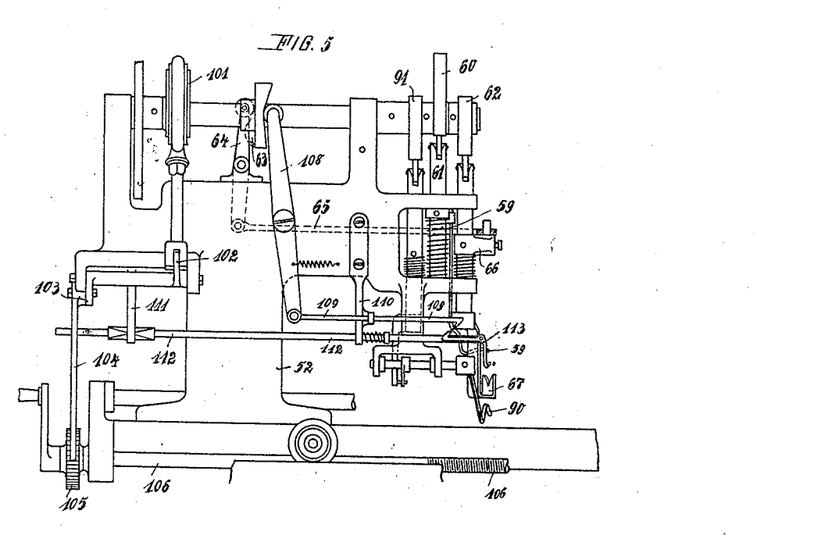
Fig. 5 is an elevation of the side opposite to that shown in Fig. 1.
Figure 6:
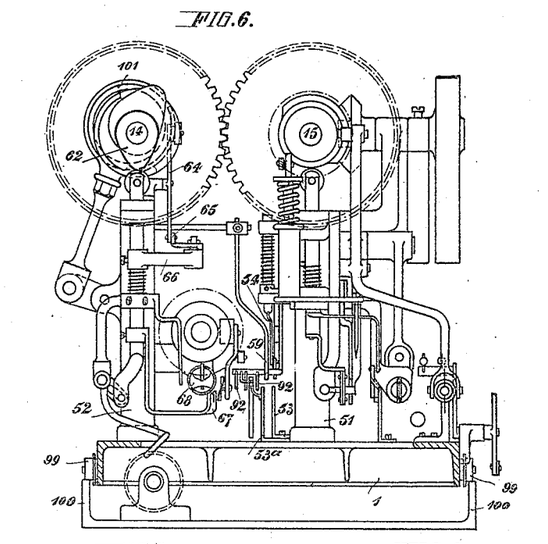
Fig. 6 is a front view of the machine, partly in section.
Figure 7:
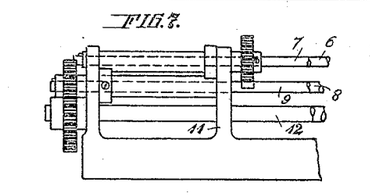
Figs. 7 and 8 are a side view and end view of certain parts broken away in Fig. 1.
Figure 8:
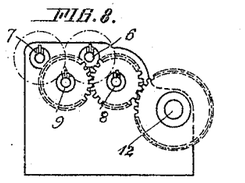

For regulating the advance of the carriage, a stop motion is provided, which throws the propelling mechanism out of gear if the advance is greater or less than required by the position of the tied threads. This device comprises a rod 109, hooked at one end and reciprocated by the cam 63 and a double-armed lever 108 (Fig. 5). A spring-pressed rod 112 slidable in bearings 110, 111 carries at one end a bell crank 113, the vertical arm of which rests against the front warp, the horizontal arm having a hook lying opposite the hooked end of the rod 109. The other end of the rod 112 is bent to an obtuse angle behind the pawl 104. If the advance of the carriage is greater than required by the consumption of thread the warp lying against the bell crank 113 rocks the latter and hooks it on to the rod 109, so that the rod 109 moves the rod 112, which disengages the pawl 104 from the ratchet wheel 105 and stops the advance of the machine until the bell crank is allowed by the thread to rock away from the hooked rod 109.

Inasmuch as the distance between the top and bottom warps varies it is necessary to provide means whereby the foremost thread of each warp is always held close to the hook of the spindle over which it passes, so that if, for example, the lower warp 3 is less close than the upper warp 2 the grippers 5 are moved toward the hook, whereas if the threads of the lower warp are closer, the opposite movement is effected. For this purpose a double-armed feeler 114 is pivoted to the carriage 1 (Figs. 1 to 4), with its lower arm at an obtuse angle to the upper arm, the weight of the lower arm pressing the upper arm lightly against the foremost thread of the lower warp 3. A rod 115 connects the lower arm of the feeler to the lower arm of a double armed lever 116, the upper arm of which carries a roller 117 adapted to lift either of two pivoted latches 118, 119 so that the nose of the lifted latch is engaged by the end of a lever 120 reciprocated at intervals by the cam 31. By this means the rod 121 or 122 to which the lifted latch is pivoted is moved longitudinally in its bearing 123, against the action of a spring 124 or 125. Beveled abutments 126, 127 at the ends of the rods 121, 122 normally rest on tails of pawls 128, 129 pivoted to a lever 132 actuated by a square disk 13, and prevent these pawls from engaging ratchet wheels 130, 131 and rotating the toothed wheels 133, 134 fixed to the latter. The toothed wheel 133 meshes with a toothed wheel 135 fixed to the shaft 10, and the wheel 134 meshes with an intermediate wheel 136 which meshes with another wheel fixed to the said shaft. The screwed shaft 10 engages a threaded eye on the carriage 137 of the grippers 5, so that this carriage is moved in one or the other direction if either of the pawls 128 or 129 is allowed to engage and rotate its ratchet wheel by the lifting of the latch 118 or 119.

If the distance of the threads of the lower warp is greater than in the upper warp, the foremost thread of the lower warp lags behind the foremost thread of the upper warp. The feeler 114 accordingly assumes an inclination to the left, and the upper arm of the lever 116 assumes a similar inclination, whereby it acts on a pendent boss of the latch 119 and lifts the latter to the position indicated by dotted lines in Fig. 1. Accordingly the rod 122 is moved and releases the pawl 129, whereby the ratchet wheel 131 is rotated and causes the carriage 137 and the lower warp to move inward until the arm 114 becomes vertical again, whereupon the lifted latch is dropped and the pawl 129 disengaged. If the density of the lower warp is greater the upper arm of the lever 116 is inclined to the right, lifts the latch 118, and causes the rod 121 to release the pawl 128, so that the ratchet wheel 130 is rotated and moves the carriage 137 outward.

Figs. 13 to 16 illustrate a device for stopping the machine in case of absence of a thread. This comprises a rod 138 reciprocated by the lever 49 and mounted in a bearing 139 which is slidable in a forked bearing 140 fixed to the frame. The front end of the rod 138 is slotted and carries two jaws 142 which are held apart by springs 141 and have shoulders 143 normally preventing them from being drawn into the bearing 139, so that they move this bearing when the rod 138 is moved to the left. The tips of the jaws lie between the threads which are dropped from the hooked spindles, so that these threads, when pressed together by the previously described jaws 42, compress the jaws 142 and allow the latter to slide into the bearing without moving same. If, however, one of the threads is missing (Fig. 14ᵃ) one of the jaws 142 remains in position to move the bearing 139 by its shoulder 143, and an abutment 144 at the rear end of the bearing actuates a lever 145, 146 pivoted to the lever 49, so that a shoe 147 fixed to the lever arm 146 is lifted. On the driving shaft 148 there is a loose wheel 149 and a fixed clutch 150, the latter comprising a spring pressed member 152 provided with a pin 151 normally engaged with a hole in the wheel 149, so that rotation of the latter is transmitted to the shaft. When the shoe 147 is lifted, it lies in the path of the pawl 152 and disengages the same from the wheel 149, so that the machine is stopped.

What we claim as our invention and desire to secure by Letters Patent of the United States is:—

1. In a warp-tying machine the combination of a carriage; means for propelling said carriage, means for uncoupling said propelling means, said uncoupling means comprising a slidable rod on said carriage; a hooked rod on said carriage, means for reciprocating said hooked rod; a bell-crank pivoted to the first-mentioned slidable rod, said bell-crank having a hooked arm adapted to engage said hooked rod and a pendant arm; means for holding warp threads in the path of said pendant arm; a tapered, tubular, slotted member on said carriage; means for rotating said member about its axis; a hook pivoted in said tubular member; means for rocking said hook whereby said hook is caused to project alternately at opposite sides of said tubular member; means for feeding warp threads to said tubular member, whereby said hook, projecting from one side of said member, is enabled to loop such threads around said member and then draw the threads through the loop in the course of its rocking movement; and means for stripping looped threads from said tubular member.

2. In a warp-tying machine the combination of a carriage; propelling mechanism for said carriage; supports for holding two warp threads one above the other in the path of said carriage; means for horizontally adjusting one of said supports in relation to the other; mechanism on the carriage for actuating said adjusting means; two coupling devices on the carriage for connecting said actuating mechanism to the adjusting means, for producing forward and rearward adjustments of the adjustable support respectively; a movable feeler on the carriage arranged to bear against a warp held by said adjustable support; means engaging said feeler with said coupling devices whereby movements of said feeler in opposite directions actuate said coupling devices respectively; a tapered, tubular slotted member on said carriage; means for rotating said member about its axis; a hook pivoted in said tubular member; means for rocking said hook whereby said hook is caused to project alternately at opposite sides of said tubular member; means for feeding warp threads to said tubular member, whereby said hook, projecting from one side of said member, is enabled to loop such threads around said member and then draw the threads through the loop in the course of its rocking movement; and means for stripping looped threads from said tubular member.

3. In a warp-tying machine the combination of a carriage; propelling mechanism for said carriage; means for holding in the path of said carriage two layers of parallel warp threads spaced apart; a series of parallel spindles on said carriage arranged alternately at different levels, whereby warp threads held by said holding means and passing over and under said spindles are placed cross-wise; a comb on said carriage having tines projecting from two opposite sides; mechanism on said carriage for reciprocating and rotating said comb, whereby the latter can be thrust between the layers of warps, rotated to engage said warps, and retracted to withdraw warps from said spindles; a needle on said carriage; mechanism on said carriage for vertically reciprocating and laterally moving said needle, whereby the latter can engage and laterally displace warps removed from said spindles; a tapered, tubular, slotted member on said carriage; means for rotating said member about its axis; a hook pivoted in said tubular member; means for rocking said hook whereby said hook is caused to project alternately at opposite sides of said tubular member; means for feeding warp threads to said tubular member, whereby said hook, projecting from one side of said member, is enabled to loop such threads around said member and then draw the threads through the loop in the course of its rocking movement; and means for stripping looped threads from said tubular member.

4. In a warp-tying machine the combination of a carriage; means for propelling said carriage; means on said carriage for uncoupling said propelling means; means for holding in the path of said carriage two parallel warp threads; means on the carriage for engaging and pressing together said warp threads; a movable bearing on the carriage adapted to actuate said uncoupling means; a rod slidable in said bearing; means on the carriage for reciprocating said slidable rod; two spring-pressed jaws pivoted to said rod in position to be thrust by said rod between said warp threads, each adapted to engage and move said bearing, but able to enter said bearing when pressed together by said warp threads; a tapered, tubular, slotted member on said carriage; means for rotating said member about its axis; a hook pivoted in said tubular member; means for rocking said hook whereby said hook is caused to project alternately at opposite sides of said tubular member; means for feeding warp threads to said tubular member, whereby said hook, projecting from one side of said member, is enabled to loop such threads around said member and then draw the threads through the loop in the course of its rocking movement; and means for stripping looped threads from said tubular member.

In witness whereof we have signed this specification in the presence of two witnesses.

OTTO FISCHER.
OSKAR FISCHER.

Witnesses:
PAUL RICHARD STOCKHAUS,
ROBERT H. VIER.